US008027504B2

(12) United States Patent
Simonsson

(10) Patent No.: US 8,027,504 B2
(45) Date of Patent: Sep. 27, 2011

(54) APPARATUS AND METHOD FOR ANALYZING IMAGE IDENTIFICATIONS GENERATED BY AN OCR DEVICE

(75) Inventor: Rutger Simonsson, Djursholm (SE)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 11/872,196

(22) Filed: Oct. 15, 2007

(65) Prior Publication Data

US 2008/0118110 A1     May 22, 2008

(30) Foreign Application Priority Data

Nov. 22, 2006  (GB) .................................. 0623236.7

(51) Int. Cl.
*G06K 9/00* (2006.01)
(52) U.S. Cl. ........ 382/100; 382/103; 382/105; 382/137; 382/321
(58) Field of Classification Search .................. 382/100, 382/103, 104, 105, 137, 138, 139, 140, 141, 382/321
See application file for complete search history.

(56) References Cited

U.S. PATENT DOCUMENTS

| | | | |
|---|---|---|---|
| 3,969,698 A | 7/1976 | Bollinger et al. | |
| 4,817,166 A | 3/1989 | Gonzalez et al. | |
| 5,455,872 A | 10/1995 | Bradley | |
| 5,970,171 A | 10/1999 | Baraghimian et al. | |
| 6,109,525 A | 8/2000 | Blomqvist et al. | |
| 6,219,453 B1 | 4/2001 | Goldberg | |
| 6,400,805 B1 | 6/2002 | Brown et al. | |
| 6,959,869 B2 | 11/2005 | Tsikos et al. | |
| 7,092,561 B2 | 8/2006 | Downs, Jr. | |
| 7,539,326 B2 * | 5/2009 | Eremita et al. | 382/101 |
| 7,738,706 B2 * | 6/2010 | Aradhye et al. | 382/182 |
| 2006/0030985 A1 | 2/2006 | Lawida et al. | |
| 2006/0064345 A1 | 3/2006 | Biet | |
| 2008/0118110 A1 | 5/2008 | Simonsson | |

FOREIGN PATENT DOCUMENTS

DE          10104502          8/2002
(Continued)

OTHER PUBLICATIONS

U.S. Appl. No. 11/693,944, Filing Date Mar. 30, 2007; Confirmation No. 1155.

(Continued)

*Primary Examiner* — Brian Q Le
(74) *Attorney, Agent, or Firm* — Schmeiser, Olsen & Watts; John Pivnichny

(57) ABSTRACT

A method for analyzing image identifications. An optical character recognition (OCR) identification of an image, an associated confidence value, and a photograph of the image are received. After determining that the received confidence value is below a predefined threshold, a data store is searched to find OCR identifications matching the received OCR identification. If the searching fails to find a matching OCR identification, then a manual agent males a correct identification of the image in the received photograph; otherwise a search score associated with each OCR identification is received. If no received search scores is above a predetermined threshold, then the message is sent to the manual agent for correct identification; otherwise the correct identification is determined based on the OCR identifications associated with the search scores above the predetermined threshold and the correct identification thus determined is subsequently transmitted to a billing system.

14 Claims, 8 Drawing Sheets

FOREIGN PATENT DOCUMENTS

| | | |
|---|---|---|
| EP | 0516316 A2 | 12/1992 |
| EP | 0585916 A1 | 3/1994 |
| EP | 0618544 A1 | 10/1994 |
| JP | 05189598 | 7/1993 |
| WO | WO09841953 | 9/1998 |

OTHER PUBLICATIONS

Office Action (Mail Date Jun. 14, 2010) for U.S. Appl. No. 11/693,944, Filing Date Mar. 30, 2007; Confirmation No. 1155.

Sep. 13, 2010 filed Response to Office Action (Mail Date Jun. 14, 2010) for U.S. Appl. No. 11/693,944, Filing Date Mar. 30, 2007; Confirmation No. 1155.

Final Office Action (Mail Date Oct. 12, 2010) for U.S. Appl. No. 11/693,944, Filing Date Mar. 30, 2007; Confirmation No. 1155.

Dec. 13, 2010 filed Response to Final Office Action (Mail Date Oct. 12, 2010) for U.S. Appl. No. 11/693,944, Filing Date Mar. 30, 2007; Confirmation No. 1155.

Advisory Action (Mail Date Mar. 14, 2011) for U.S. Appl. No. 11/693,944, Filing Date Mar. 30, 2007; Confirmation No. 1155.

Apr. 8, 2011 filed Notice of Appeal for U.S. Appl. No. 11/693,944, Filing Date Mar. 30, 2007; Confirmation No. 1155.

English Abstract of JP 05189598, Jul. 30, 1993, Mori et al., 2 pages.

Notice of Allowance (Mail Date Jul. 1, 2011) for U.S. Appl. No. 11/693,944 Filing Date Mar. 30, 2007; Confirmation No. 1155.

Request for Continued Examination (Submitted Aug. 22, 2011) for U.S. Appl. No. 11/693,944; Filing Date Mar. 30, 2007; Confirmation No. 1155.

* cited by examiner

OCR identification | Interpreted value
--- | ---
 700 | ABC 123
 705 | CDE 345
 710 | DEF 456
 715 | Vehicle registration number Can not be interpreted

APPARATUS AND METHOD FOR ANALYZING IMAGE IDENTIFICATIONS GENERATED BY AN OCR DEVICE

FIELD OF THE INVENTION

The invention relates to the field of optical character recognition systems (OCR). In particular, the invention relates to an apparatus and method for correcting erroneous image identifications generated by optical character recognition devices.

BACKGROUND OF THE INVENTION

More and more systems, whether these are security systems or road charging systems, rely on the taking of photographs in order to identify people or vehicles. Information is extracted from the photograph, such as a vehicle registration number or an employee number, in order to identify the person or vehicle in the photograph.

When relying on these photographs for identification or data extraction purposes, the quality of the photograph plays a vital part. There are many variables that can hinder the taking of a good photograph. Often the weather obscures the image in a photograph. For example, the weather may be sunny and bright and although this would seem good weather conditions for taking a photograph, the sun may reflect on the vehicle's paint work and cause a certain amount of glare, thus causing distortion of the image in the photograph. On another day it may be snowing and thus a clear image cannot be taken because the snow is adhering to the vehicle thus obscuring the vehicle registration number. The availability of an adequate light source in which to illuminate the vehicle's registration number has an impact on whether a clear image of the vehicle's registration number can be taken. Other facts may include how fast the vehicle is travelling, the vehicle's height and size, etc. The fact that the characters that make up the vehicle licence plate have been manipulated and therefore display an invalid vehicle registration number or the angle of the camera may be positioned too narrowly in relation to the position of the vehicle's registration number and therefore the resulting photograph is of poor quality.

In order to use information that is contained within a photograph, optical character recognition (OCR) systems are deployed to translate characters within the image into a standard encoding scheme. The translated characters can then be processed by a computer program to perform a data look up operation against, for example, a vehicle registration number database, in order to locate the registered owner of a vehicle and to interface with a charging system in order to charge the registered owner of the vehicle a sum of money for travelling through the charging point area. Problems arise when a photograph taken of a vehicle registration number plate is not a true and accurate representation of the vehicle registration number due to a camera taking a poor quality photograph.

In order to process a photograph in order to extract information from it, an OCR system processes a photograph by translating each character identified in the photograph into a series of computer readable characters. The OCR translates the characters identified in the images according to a defined format. For example, a predefined format may state that for all vehicles having a GB vehicle registration number, the format is two alphabetic characters, followed by two numerical characters, followed by three alphabetic characters. However, when an OCR device is translating characters identified in the image and the image is of poor quality, the OCR device has to 'guess' what a character might be. For example, is the alphanumeric character an 'I' or an '1' etc. Often, around five to twenty percent of characters are misrecognised, which leads to the incorrect registered owners being charged or some registered owners not being charged at all. This problem is also compounded, in a congestion charging environment, by the fact that some vehicles will drive through a charging point several times a day. Often, when a charging system is unable to locate the registered owner of a vehicle, the charging system will send the translated OCR identification along with the photograph that the translation comes from to a manual agent for identification. Manual agents, through their own experience are then able to interpret the OCR translation for sending back to the charging system.

Thus there is a need for a method and an apparatus in which erroneous OCR identifications generated by OCR devices can be corrected.

SUMMARY OF THE INVENTION

The present invention provides a method for analyzing image identifications, said method comprising:

receiving an optical character recognition (OCR) identification of an image, a confidence value associated with the received OCR identification, and a photograph from which the received OCR identification was derived;

determining that the received confidence value is below a predefined threshold;

after said determining that the received confidence value is below the predefined threshold, searching a data store to find at least one OCR identification stored in the data store that matches the received OCR identification, wherein the data store stores photographs of images, OCR identifications derived from the stored photographs, and correct identifications of the images in the stored photographs, and wherein the correct identifications were previously determined by a manual agent from said photographs of images;

if said searching fails to find the at least one OCR identification, then sending a message to a manual agent, wherein the message comprises the received photograph and a request that the manual agent make a correct identification of the image in the received photograph;

if said searching finds said at least one OCR identification, then:

receiving a search score associated with each OCR identification of the least one OCR identification, wherein each search score is indicative of how close each associated OCR identification is to the received OCR identification;

ascertaining whether one or more received search scores are above a predetermined threshold;

if said ascertaining ascertains that one or more received search scores are not above the predetermined threshold then sending the message to the manual agent;

if said ascertaining ascertains that one or more received search scores are above the predetermined threshold then determining the correct identification of the image associated with the received OCR identification based on the OCR identifications associated with the one or more received search scores above the predetermined threshold and transmitting the correct identification of the image associated with the received OCR identification to a billing system.

The present invention provides a data processing system for correcting erroneous OCR identification received from an OCR device in a charging environment, the data processing system comprising: a central processing unit, a memory device and a storage device adapted for carrying out the method of the present invention.

The present invention provides a computer program loadable into the internal memory of a digital computer, comprising software code portions for performing, when said product is run on a computer, to carry out the method of the present invention.

Advantageously, the present invention provides for improved accuracy of OCR image identifications. Manually interpreted image identifications are stored in a data store. When an OCR identification is received along with its OCR generated confidence level, the apparatus analyses the confidence level to determine whether it falls above or below a predefined confidence threshold. If the confidence threshold falls below the predefined confidence level, the apparatus performs a search in the database of manually interpreted images for an image the matches or closely matches the received OCR identification. If a match or close match is located, the received OCR identification is replaced with the located manually interpreted image. Thus the apparatus can verify OCR identifications more quickly and the apparatus does not have to rely on the manual agents to perform interpretation analysis.

DETAILED DESCRIPTION OF THE INVENTION

Figure 1:
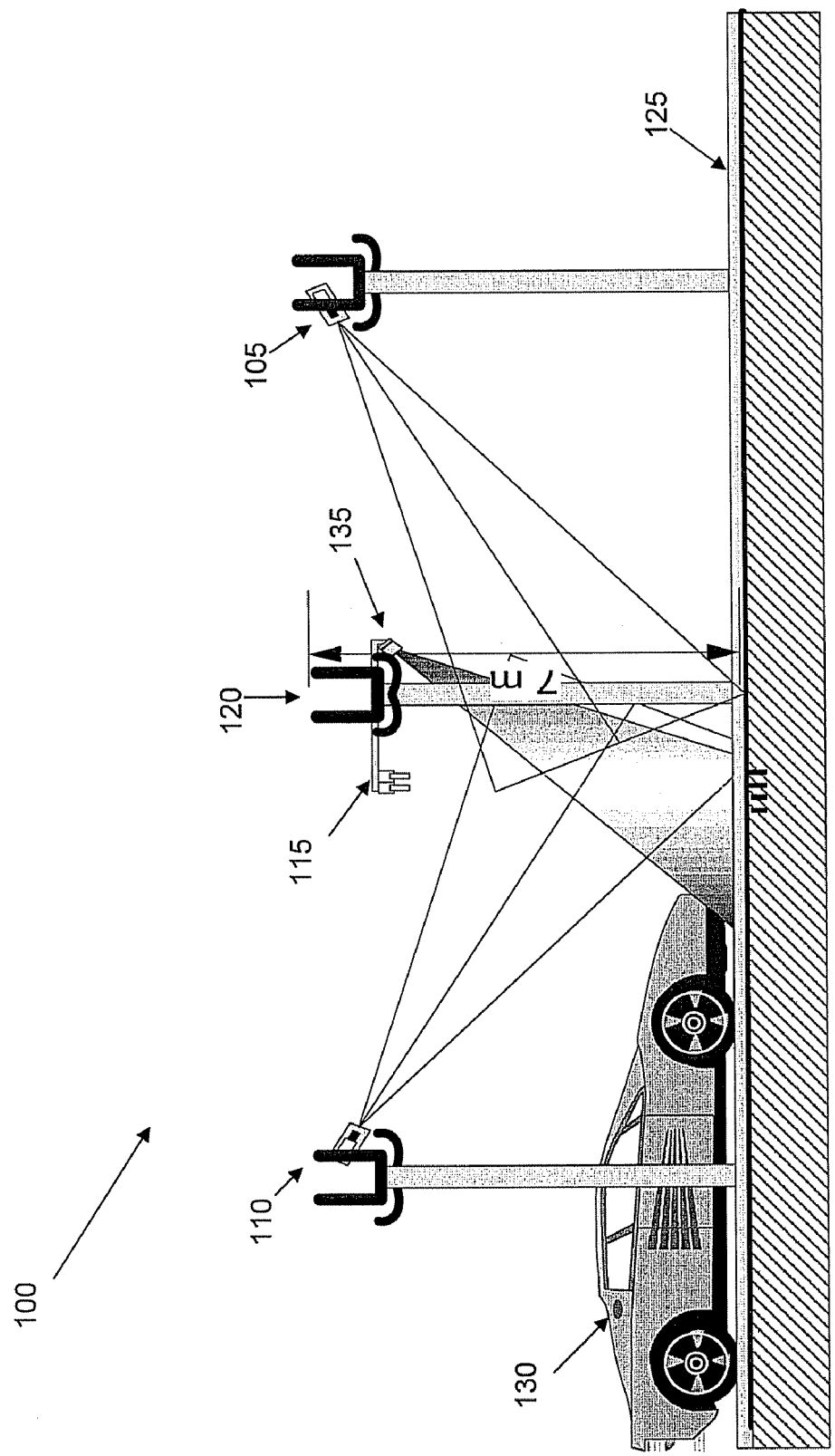
FIG. 1 is a block diagram detailing a vehicle driving through a charging point area in which an image is taken of the vehicle's front licence plate in accordance with embodiments of the present invention.

FIG. 1 shows a vehicle 130 travelling along a road 125 through a charging point area 100. The charging point area 100 comprises at least one camera 105, 110 for taking an image of an aspect of the vehicle 130. For example, the camera 105 may take an image of the vehicle's front vehicle registration number. The charging point area 100 may also comprise a camera 110 for taking a photograph of the vehicle's rear licence plate.

The charging point area 100 also comprises a laser detector 115 for detecting the presence of the vehicle 130 in the charging point area 100 and, on detection of the vehicle 130 in the charging point area 100, triggering the first camera 105 to take an image. As the vehicle 130 drives through the charging point area 100, the laser 115 triggers a second camera 110 to take an image of, for example, the vehicle's rear registration number. Each camera 105, 110 stores the images in memory and transmits the images to a central data store via a network communication means (not shown).

A light 135 is also provided which illuminates the road 125 in order to illuminate an aspect of the vehicle 130 as the vehicle drives through the charging point area 100. In the illustration of FIG. 1, the camera 105 is talking a photograph of the vehicle's front licence plate. The photograph is stored in a data store (not shown) along with information such as the date, the time, and an identifier identifying the location of the charging point.

Figure 2:
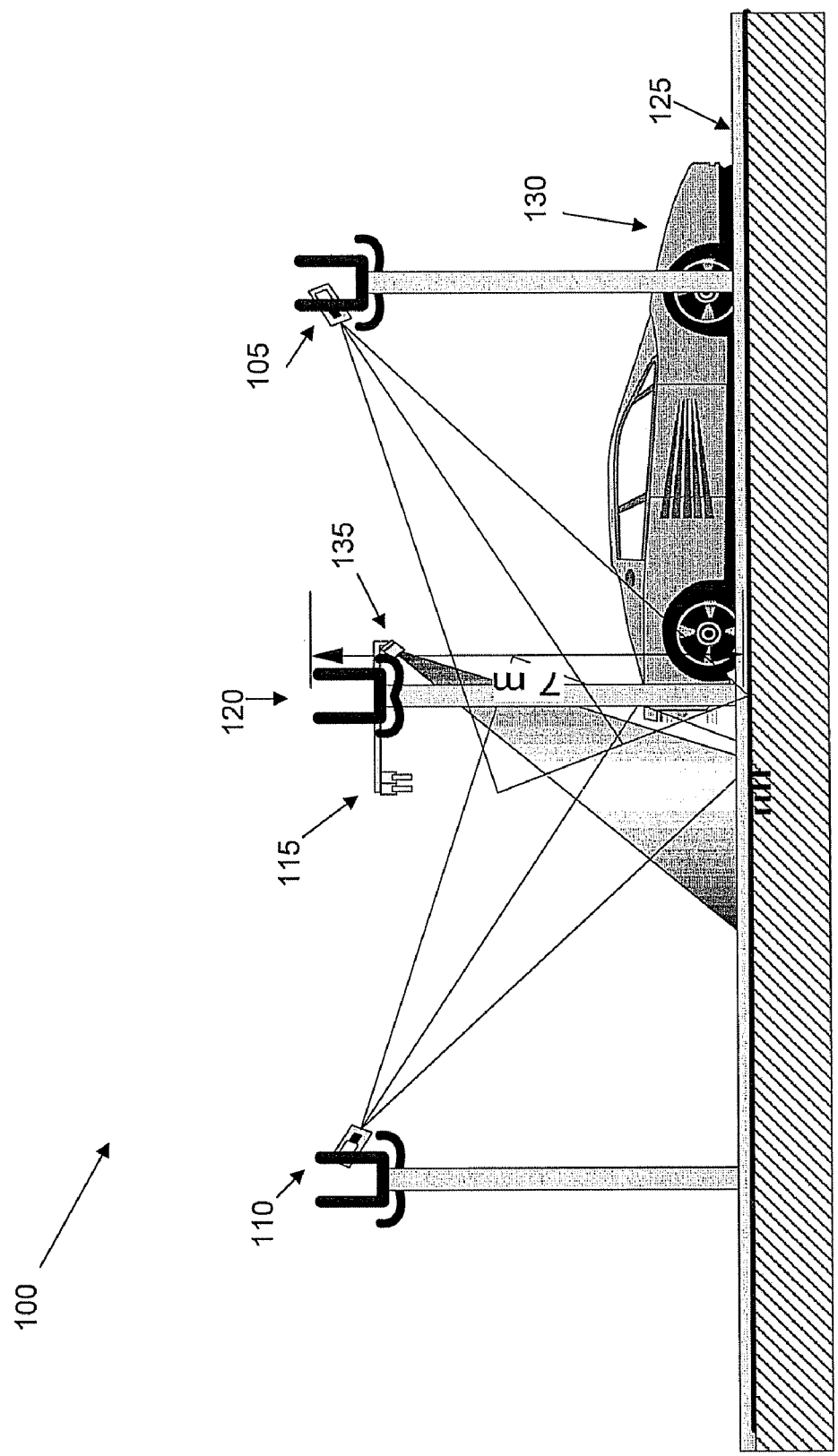
FIG. 2 is a block diagram detailing a vehicle driving through a charging point area in which an image is taken of the vehicle's rear licence plate in accordance with embodiments of the present invention.

FIG. 2 illustrates the same charging point area 100 as in FIG. 1, but in this example the vehicle 130 is continuing through the charging point area 100, until such a time that the laser 115 triggers the second camera 110 to take a photograph of the vehicle's rear licence plate. Again, the same light 135 illuminates in a downwardly direction towards the road 125, illuminating an aspect of the vehicle 130 as the vehicle 130 continues to drive through the charging point area 100. The photograph of the rear licence plate is stored in a data store along with information such as the date, the time and an identifier identifying the location of the charging point area 100. Optionally, vehicles 130 may be operable for cooperating with an onboard charging unit (not shown) which identifies vehicles 130 as they pass through the charging point area 100. An antenna 120 connected to one or more transmitters (not shown) detects when a vehicle 130 is passing through the charging point area 100.

Figure 3:
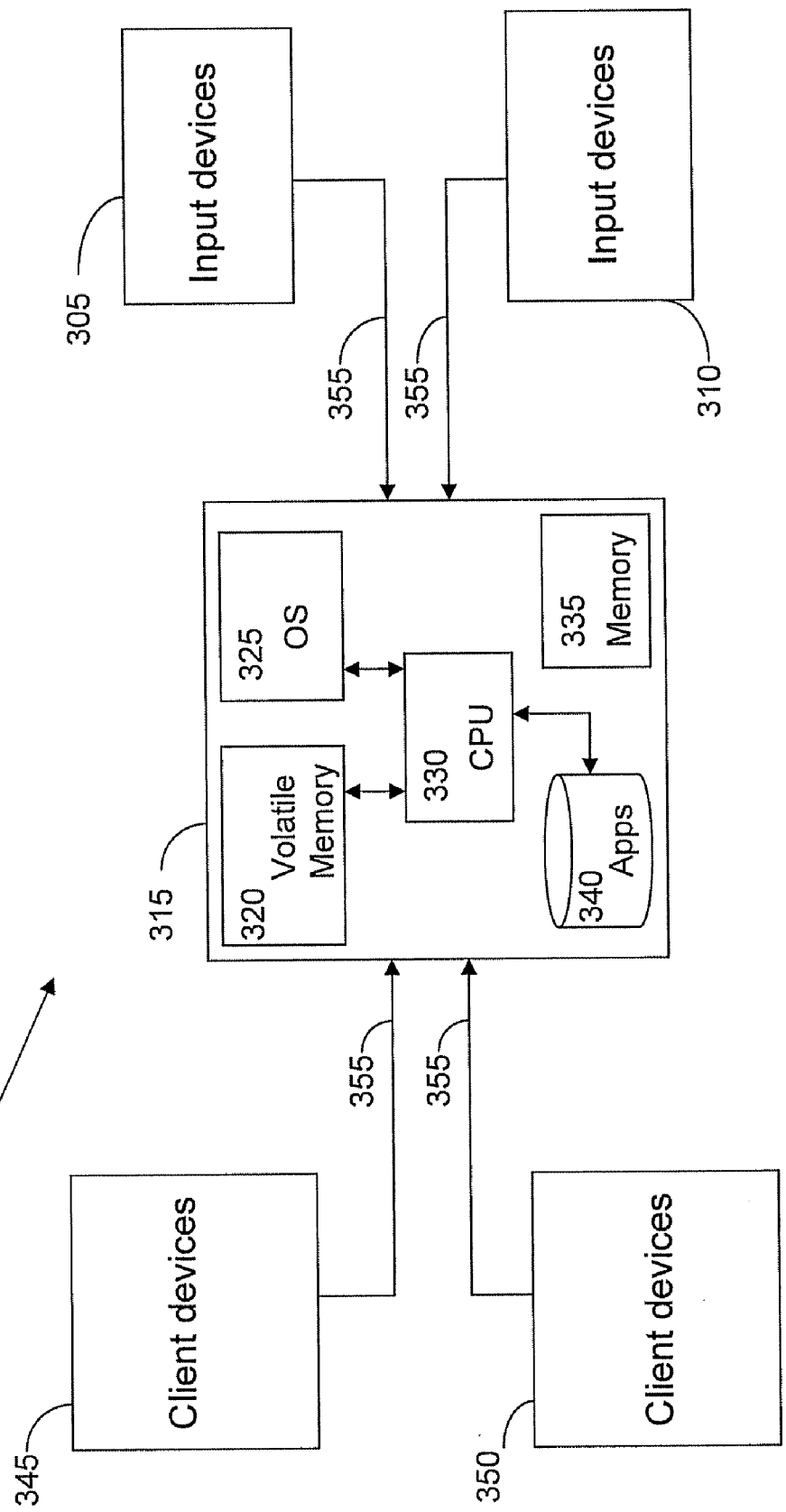
FIG. 3 is a block diagram detailing a data processing system in which embodiments of the present invention may be implemented.

Each charging point area 100 interfaces with a distributed data processing system. One such data processing system is shown in FIG. 3. The data processing system 300 comprises a number of input devices 305, 310, such as a camera 305 or an on-board computing device configurable for operating in a vehicle 130. The input devices 305, 310 transmit data for receiving by a computing device 315, for example, a server. The computing device 315 comprises a CPU 330, volatile memory 320, and non volatile memory 335 on which applications are stored and executed. The data received from the input devices is stored in a data store 340 until such a time as applications request access to the data store 340 for processing the data. The data store may be located locally on the computing device or accessed across a network 355 for example, accessed via network attached storage or a storage area network.

Client devices 345, 350 are configurable for interfacing with the computing device 315 in order to provide data input means. For example, a client device 345, 350 may manage software which triggers image capture software via a camera attached to the computing device.

In order to process the images taken by a camera 105, 110 or other image capture device it is necessary for the data in the image to be translated into some meaningful form. For example, in a road charging environment, the vehicle registration number must be captured from the image of the vehicle's front or rear licence plate in order for the registered owner of the vehicle to be identified and billed.

In one embodiment more than one optical character recognition (OCR) engine is deployed. OCR engines are known in the art and translate images of characters into a standard encoding scheme representing the translated characters in ASCII or Unicode. In an embodiment of the present invention several OCR engines are deployed to extract the registration numbers of vehicles 130 taken from images captured of a vehicle's licence plate.

Figure 4:
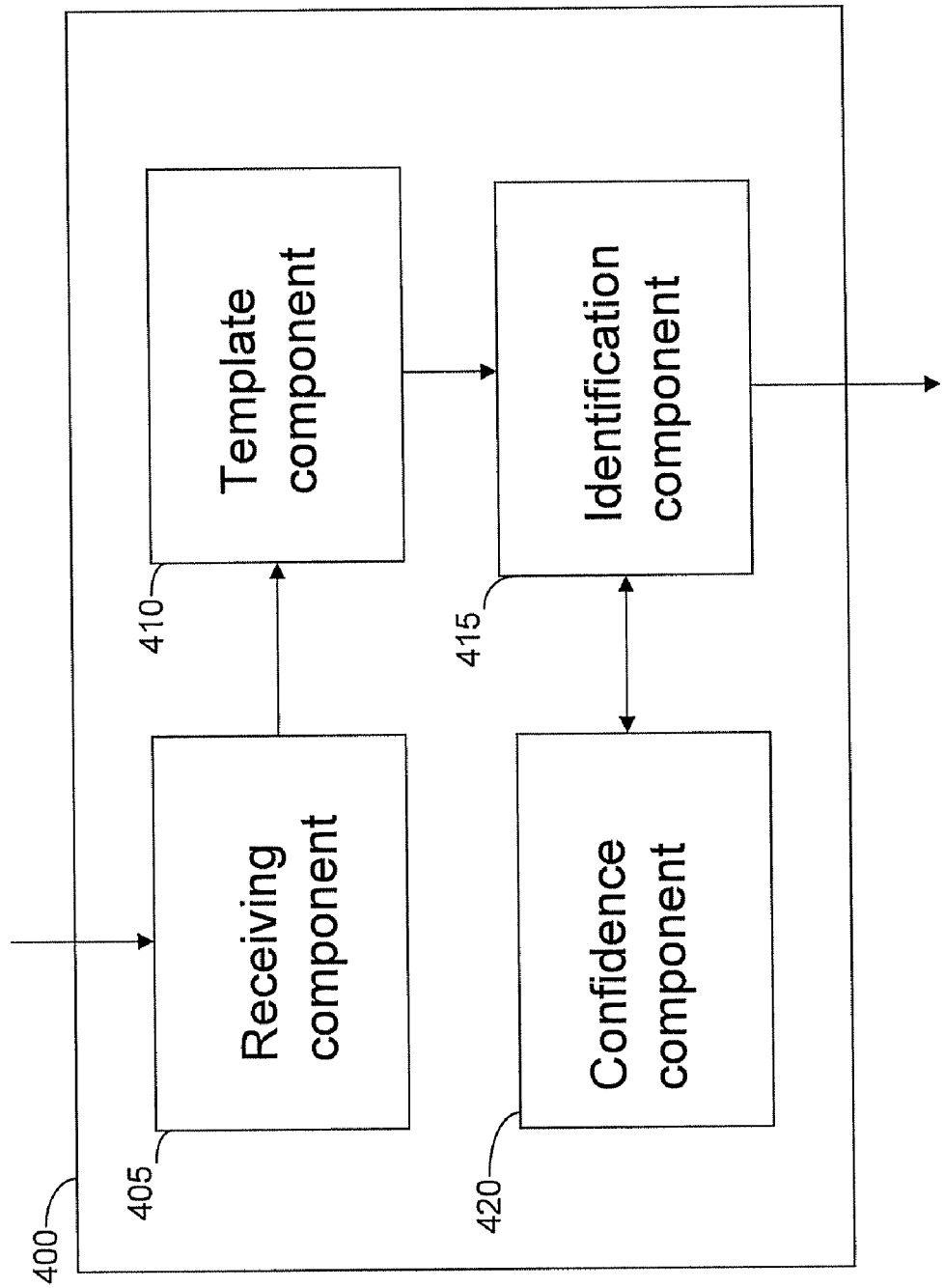
FIG. 4 is a block diagram detailing an optical character recognition (OCR) engine and the OCR's sub components as is known in the art.

An OCR engine is shown in FIG. 4. The OCR engine 400 comprises a receiving component 405 for receiving data packets comprising images representative of the front licence plate and the rear licence plate of vehicles, a template component 410 for describing the syntax of, for example, a licence number of a licence plate (e.g., HT66 HOP), an identification component 415 for identifying characters within the image which male up a vehicle's vehicle registration number in accordance with the syntax detailed within the template, and a confidence level component 420 for deriving a confidence level from the ease in which the identification component 410 identifies a character within the captured image of the vehicle's vehicle registration number.

The template component 410 details the syntax of the data to be identified; for example, the correct syntax of a vehicle registration number, an employee serial number, or any other data which needs to be captured from an image. Using the example of vehicle registration number: in Sweden, the syntax for a vehicle registration number is three letters followed by three digits; in Norway and Denmark, the syntax is two letters and five digits; and in the UK, the syntax is two letters, followed by two digits, followed by three letters.

The identification component 415 parses each image and tries to identify each of the characters of the vehicle's vehicle registration number and to determine whether the extracted characters meet with the required syntax. The identification component 410 deploys a matching algorithm in order to carry out the identification and to determine a confidence level in which each character is identified. For example, talking the vehicle registration number HT55 HNX, the matching algorithm tries to confidently identify that the character H in the image is the letter H, the character T is the letter T, the character 5 is the number 5, the next character 5 is the number 5 and the characters H, N and X are the letters H, N, and X and so on.

Figure 5:
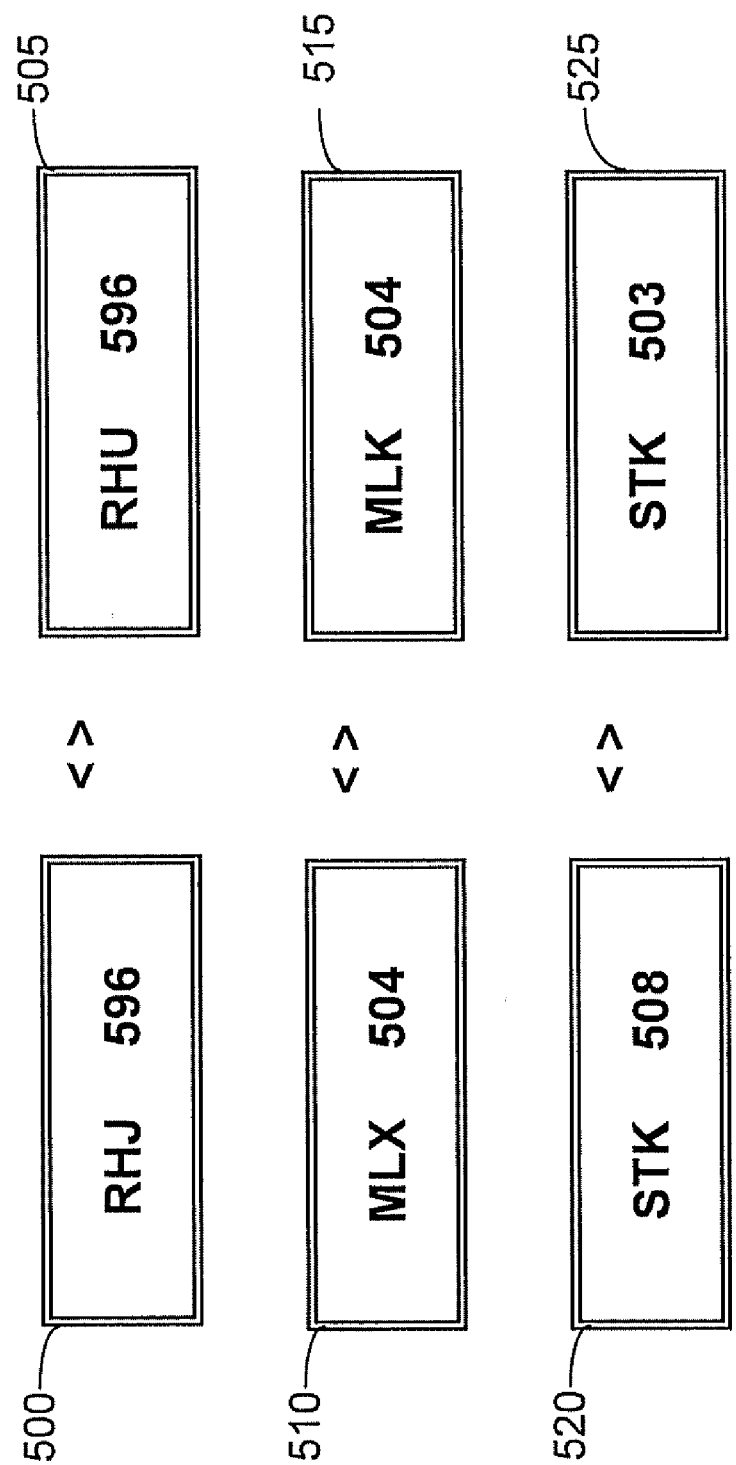
FIG. 5 is a block diagram showing vehicle registration numbers and the same vehicle registration numbers as identified by an OCR engine.

For example, in FIG. 5, a number of vehicle registration numbers are shown. The registration numbers 500, 510, 520 are the characters captured in an image. The registration numbers 505, 515, 525 are the character strings derived from the matching algorithm. As is shown, the matches are far from accurate and thus the identifications and confidence levels can not always be relied upon.

Figure 6:
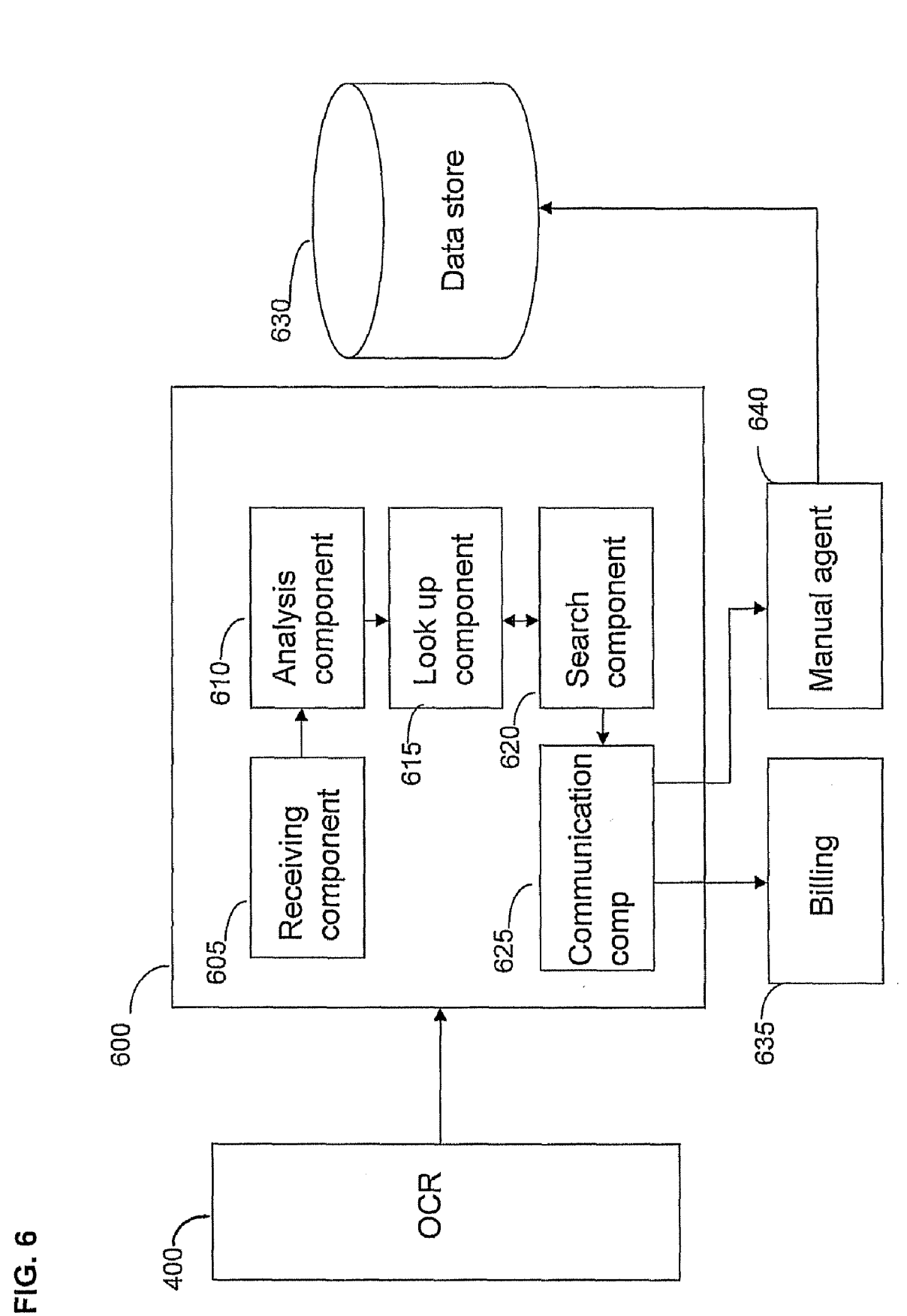
FIG. 6 is a block diagram showing the components of the character identification engine in accordance with embodiments of the present invention.

In accordance with an embodiment of the present invention, an image identification engine 600 is provided in FIG. 6, in which an image identification engine 600 identifies, from a data store of previously manually interpreted identifications, the most likely OCR identification.

The image identification engine 600 is configurable for interfacing with an OCR system 400 and a database of manually interpreted character identifications 630.

The image identification engine 600 comprises a number of components which interface and interact with each other in order to correct OCR identifications communicated from an OCR system such that the corrected OCR identification can be identified and processed further.

The components of the image identification engine 600 comprise a receiving component 605 for receiving OCR identifications and its related confidence value and at least one photograph of a vehicles registration number from an OCR system. A analysis component 610 for analysing the OCR identifications and its related confidence value to determine whether any further processing of the OCR identification is required, a look-up component 615 for receiving instructions from the analysis component 610 and performing a lookup in a data store 630 of manually interpreted identifications to locate a matching image identification, a search component 620 for searching for matching OCR identifications in the data store 630 of manually interpreted OCR identification, and a communication component 625 for communicating with a billing system based on a positive determination of a matching character identification or for communicating with a manual agent for further interpretation based on a negative determination by the look-up component. Each of these components will be explained in turn.

The receiving component 605 receives the OCR identification, the photograph that the OCR identification was taken from, and the OCR generated confidence level from the OCR system 400. The receiving component 605 assigns a unique identifier to the OCR identification and stores the unique identifier in the data store 630 along with the photograph. In order to further process the OCR identification, the receiving component 605 parses the confidence level and determines whether the confidence level is above or below a predetermined confidence level; i.e. whether the OCR system confident has correctly identified the vehicle registration number in the photograph. Using a number of rules, the receiving component 605 determines whether the confidence level is above or below the predefined threshold. For example, if the confidence level is above 95%, then a rule may state that in this instance the OCR system is confident that the OCR identification is correct.

However, if the confidence level is 70%, a rule may state that in this instance the OCR system is not confident that the OCR identification is correct. If the receiving component 605 determines that the OCR system 400 is confident that the identification is correct, the receiving component 605 transmits the OCR identification to the communication component 625 for transmitting onto, for example, a billing system 640. The billing system is configured to utilize the correct identification to bill a party associated with the received OCR identification (e.g., the owner of the vehicle whose vehicle registration number is the correct identification). However, if the receiving component 605 determines that the OCR identification in incorrect, the receiving component 605 transmits the OCR identification onto the analysis component 610 for further identification.

The data store 630 comprises OCR identifications that have been manually interpreted by a manual agent 640. Each time an OCR identification is identified as having a low confidence level and therefore the vehicle registration number can not be identified, the OCR identification, the photograph from which the OCR identification is derived, and the correctly identified vehicle registration number is stored in the data store 630.

The analysis component 610 interfaces with a look-up component 615 and a data store 630 to determine if the same or similar OCR identification has been previously manually interpreted. The analysis component 610 begins by parsing the OCR identification and sending a request to the look-up component 615 to determine if the same OCR identification has been identified before and stored in the data store 630.

The lookup component 615 interfaces with a search component 620 to search the data store 630 to locate an exact or closely similar OCR identification match. For example, referring to FIG. 7, the search component 620 will search for an image identification that matches ABC 123. This includes matching the characteristics of parts of the characters A, 1, 2 and 3 being obscured in the OCR identification because, for example, in this instance the vehicle registration number plate has been damaged. A person skilled in the art will realise that there are many imaging searching algorithms that can locate an identical match or a closely similar match to the image that is being searched for. The image searching algorithm can return a percentage score with each image found to indicate how close the match is to the image being requested. Image searching algorithms are known in the art and will not be discussed further here.

Next the search component 620 locates the corresponding entry entered by the manual agent 640 with the correctly interpreted vehicle registration number and returns the result to the analysis component 610. The analysis component 610 then rates the search result and appends the rating to the relevant entry in the database. The more 'hits' an OCR identification gets the more confident the search component 620 can be of returning a positive set of search results. Thus the data base can track vehicle characteristics. For example, referring once again to FIG. 7, a vehicle 130 travels through a charging area 100 at 10:00 am and a camera 110 takes a photograph of the vehicle registration number CDE 345 as depicted by reference numeral 705. As is shown the vehicle registration number plate is obscured by dirt and the individual characters are difficult to see. In this example, the analysis component 610 determines that OCR identification has a low confidence level and further analysis is required.

The analysis component 610 sends a request to the search component 620 to perform a lookup in the data store to determine whether this OCR identification has been identified before. The search component 620 will try and locate an OCR identification of the characters CDE 345 obscured by dirt. On this occasion no matching OCR identification is found and the search component 620 returns the search results and the analysis component 610 sends a request to the communication component requesting a manual agent to identify the OCR identification using the photograph and on a positive determination update the data store with the resultant identification by the manual agent.

On the same day at 12:20 pm, the same vehicle 130 travels through the same or another vehicle charging area 100. Again, a photograph 110 is taken of the vehicle's licence plate and an OCR system translates the image into a preferred encoding scheme. The vehicle's licence plate is still obscured by dirt and generates the same confidence level as before. The character image identification component 600 receives the OCR identification and the search component 620 performs a look-up in the data store 630 and locates an OCR identification matching the received OCR identification as shown in reference numeral 705. On this occasion the entry in the database is found and a search hit is scored against the entry in the database. The search component 620 returns the search results with its associated score. If the same vehicle 100 travels through the charging point area 100 again the same day or the next day, the next week or the next month etc, the search component 620 will continue to score each search hit against the OCR identification in the database. The higher the score the more confident the analysis component 610 is that the search results are accurate.

The analysis component 610 on receipt of the search results determines if the search score falls above or below a predetermined threshold value this is achieved by using a number of programmable rules. If the search score falls on or above the predetermined threshold the analysis component 610 transmits the correct OCR identification to the communication component 625 for transmitting to a billing system 635. However, if the search score is determined as falling below the predetermined threshold value the analysis component 610 transmits a message to the communication component 625 for sending a request to a manual agent for further analysis. The manual agent on identifying the correct OCR identification updates the data store 630 with the correct identification.

Figure 8:
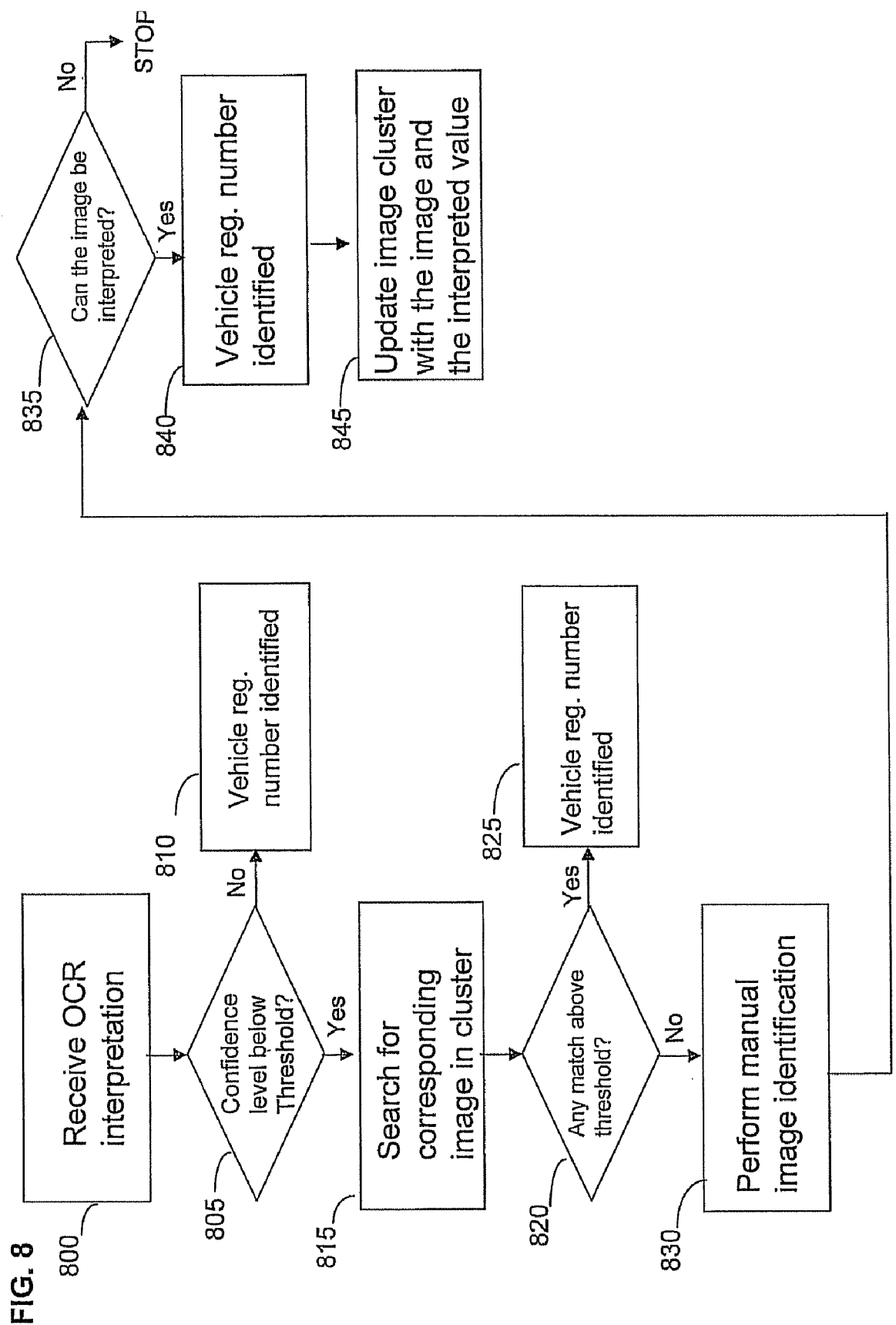
FIG. 8 is a flow chart detailing the process steps of the character identification engine in accordance with embodiments of the present invention.

Moving on to FIG. 8, the process steps of the character identification engine are explained.

At step 800, the receiving component 605 receives the OCR, an OCR identification, the photograph from which the OCR identification was derived, and the OCR identification's confidence level. At step 805, the receiving component 605 determines if the confidence level falls below or not below a predetermined threshold. If the determination is positive (i.e., the confidence level is not below the predetermined threshold), then the receiving component 605 sends the positive determination to the communication component 625 for transmitting to, for example, a billing system 635 at step 810. However, if the receiving component 605 determines that the confidence level falls below the predetermined threshold, then the receiving component 605 passes control to the analysis component 610 for further processing in step 815.

Figure 7:
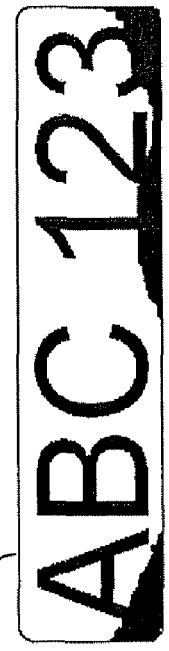
FIG. 7 is a diagram detailing a number of obscured vehicle licence plates as is known in the art.
Figure 7:
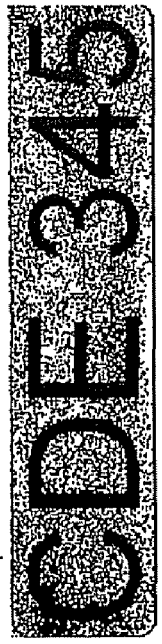
Figure 7:
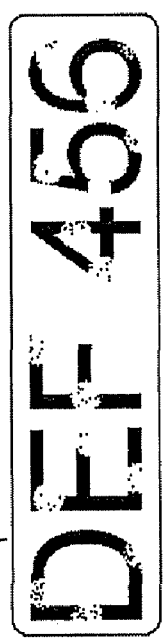
Figure 7:
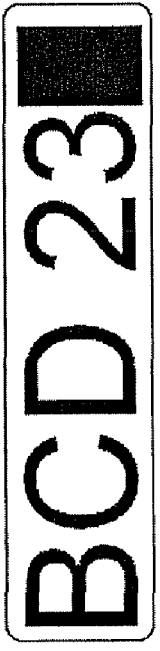

At step 815, the analysis component 610 transmits a request to a search component 620 to search for an OCR identification matching the received OCR identification (e.g., reference numeral 710 of FIG. 7). The look-up component 615 accesses the data store 630 and the search component 620 searches through the data store 630 of manually interpreted OCR identifications. The search component 620 searches for an exact match to the received OCR identification (715). The search component 620 returns a set of search results matching the requested OCR identification (715). The analysis component 610 determines whether at least one returned search score falls above a predetermined threshold at step 820. If the determination is positive (i.e., at least one returned search score falls above the predetermined threshold), then the analysis component 610 transmits a notification to the communication component 625 for further processing (i.e., for transmitting to a billing system 635 etc.). If the search component 620 returns within its search results more than one match (i.e., more than one returned search score falls above the predetermined threshold), then the analysis component 610 will select the returned search result with the highest search score.

If on the other hand the search component 620 cannot find any suitable match in the data store 630 (i.e., no returned search score falls above the predetermined threshold—e.g., reference numeral 720 of FIG. 7), then the analysis component 610 transmits a notification to the communication component 625 requesting review of the received OCR identification by a manual agent 640 at step 830 and step 835.

In step 830, the manual agent 640 attempts to perform a manual image identification. In step 835, the manual agent 640 determines if the image can be interpreted. If step 835 determines that the image can be interpreted, then the manual agent 640 is requested to update in step 845 the data store 630 with the correct identification on completion of the image identification by the manual agent 640 at step 840. If step 835 determines that the image cannot be interpreted, then the image is not identified by the manual agent 640.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for analyzing image identifications, said method comprising:

receiving an optical character recognition (OCR) identification of an image, a confidence value associated with the received OCR identification, and a photograph from which the received OCR identification was derived;

determining that the received confidence value is below a predefined threshold;

after said determining that the received confidence value is below the predefined threshold, searching a data store to find at least one OCR identification stored in the data store that matches the received OCR identification, wherein the data store stores photographs of images, OCR identifications derived from the stored photographs, and correct identifications of the images in the stored photographs, and wherein the correct identifications were previously determined by a manual agent from said photographs of images;

if said searching fails to find the at least one OCR identification, then sending a message to a manual agent, wherein the message comprises the received photograph and a request that the manual agent make a correct identification of the image in the received photograph;

if said searching finds said at least one OCR identification, then:

receiving a search score associated with each OCR identification of the least one OCR identification, wherein each search score is indicative of how close each associated OCR identification is to the received OCR identification;

ascertaining whether one or more received search scores are above a predetermined threshold;

if said ascertaining ascertains that one or more received search scores are not above the predetermined threshold then sending the message to the manual agent;

if said ascertaining ascertains that one or more received search scores are above the predetermined threshold then determining the correct identification of the image associated with the received OCR identification based on the OCR identifications associated with the one or more received search scores above the predetermined threshold and transmitting the correct identification of the image associated with the received OCR identification to a billing system.

2. The method of claim 1, wherein said searching fails to find the at least one OCR identification.

3. The method of claim 1, wherein said searching finds the at least one OCR identification and said ascertaining ascertains that one or more received search scores are not above the predetermined threshold.

4. The method of claim 1, wherein said searching finds the at least one OCR identification or said ascertaining ascertains that one or more received search scores are not above the predetermined threshold, and wherein the method further comprises:

receiving the message, said receiving the message performed by the manual agent; and after said receiving the message, making a correct identification of the image in the received photograph and storing the received photograph, the received OCR identification, and the correct identification in the data store, wherein said making the correct identification and said storing are performed by the manual agent.

5. The method of claim 1, wherein said searching finds the at least one OCR identification and said ascertaining ascertains that one or more received search scores are above the predetermined threshold.

6. The method of claim 5, wherein said determining the correct identification of the image associated with the received OCR identification comprises:

selecting an OCR identification associated with the highest search score of the one or more received search scores above the predetermined threshold;

determining a correct identification in the data store associated with the selected OCR identification; and designating the correct identification of the image associated with the received OCR identification as the determined correct identification in the data store associated with the selected OCR identification.

7. The method of claim 6, wherein the at least one OCR identification consists of a single OCR identification.

8. The method of claim 6, wherein the at least one OCR identification comprises a plurality of OCR identifications.

9. The method of claim 8, wherein the one or more received search scores above the predetermined threshold comprise a plurality of search scores above the predetermined threshold.

10. The method of claim 6, wherein the one or more received search scores above the predetermined threshold consist of a single search score above the predetermined threshold.

11. The method of claim 1, wherein the received OCR identification consists of a plurality of text characters.

12. The method of claim 11, wherein the plurality of text characters is a vehicle registration associated with a vehicle.

13. A data processing system comprising a processor and a memory device coupled to the processor, said memory device containing software code that when executed by the processor performs the method of claim 1.

14. A computer program product, comprising a memory device having software code stored therein, said memory device not being a signal, said software code when executed on a processor of a data processing system performs the method of claim 1.

* * * * *